US012712873B2

(12) United States Patent
Horwitz et al.

(10) Patent No.: US 12,712,873 B2
(45) Date of Patent: Aug. 18, 2026

(54) CROSS-TENANCY RESOURCE ASSOCIATION FOR CONTAINER ORCHESTRATION SYSTEM

(71) Applicant: Oracle International Corporation, Redwood Shores, CA (US)

(72) Inventors: Joshua Horwitz, Centreville, VA (US); Srinidhi Chokkadi Puranik, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 160 days.

(21) Appl. No.: 18/622,431

(22) Filed: Mar. 29, 2024

(65) Prior Publication Data

US 2025/0294020 A1 Sep. 18, 2025

Related U.S. Application Data

(60) Provisional application No. 63/564,247, filed on Mar. 12, 2024.

(51) Int. Cl.
*H04L 9/40* (2022.01)
*G06F 9/451* (2018.01)
(Continued)

(52) U.S. Cl.
CPC ........ *H04L 63/083* (2013.01); *G06F 9/45558* (2013.01); *G06F 2009/45587* (2013.01); *G06F 2009/45595* (2013.01)

(58) Field of Classification Search
CPC ............... H04L 63/083; G06F 9/45558; G06F 2009/45587; G06F 2009/45595
(Continued)

(56) References Cited

U.S. PATENT DOCUMENTS 6,697,851 B1 * 2/2004 Althaus ............... H04L 61/5014 370/254
12,534,926 B2 * 1/2026 Lewis ....................... E04H 4/14
(Continued)

FOREIGN PATENT DOCUMENTS

CN 106878341 A * 6/2017 ......... H04L 63/1416
CN 111309448 A 6/2020
(Continued)

OTHER PUBLICATIONS

"AWS Fargate", Retrieved from https://aws.amazon.com/fargate/, Retrieved on Apr. 11, 2024, pp. 1-10.
(Continued)

*Primary Examiner* — Berhanu Shitayewoldetsadik
(74) *Attorney, Agent, or Firm* — Invoke

(57) ABSTRACT

Techniques for a container orchestration system are disclosed. A container instance control plane receives a request corresponding to a container instance associated with a particular subnet. The container instance control plane determines if a first subnet assigned to the virtual agent matches the particular subnet associated with the container instance. Responsive to determining that the first subnet assigned to the virtual agent matches the particular subnet associated with the container instance, the container instance control plane permits the request corresponding to the container instance. Based at least on the request being permitted, the container instance control plane executes at least one operation corresponding to the request.

20 Claims, 8 Drawing Sheets

(51) Int. Cl.

| | |
|---|---|
| ***G06F 9/455*** | (2018.01) |
| ***G06F 9/50*** | (2006.01) |
| ***G06F 9/54*** | (2006.01) |
| ***G06F 11/30*** | (2006.01) |
| ***G06F 11/32*** | (2006.01) |
| ***H04L 9/08*** | (2006.01) |
| ***H04L 9/32*** | (2006.01) |
| ***H04L 15/16*** | (2006.01) |
| ***H04L 41/046*** | (2022.01) |
| ***H04L 45/74*** | (2022.01) |
| ***H04L 47/20*** | (2022.01) |

(58) Field of Classification Search
USPC .............................................................. 726/1
See application file for complete search history.

(56) References Cited

U.S. PATENT DOCUMENTS

| | | | | |
|---|---|---|---|---|
| 12,609,847 | B2 * | 4/2026 | Murphy | E04H 4/1245 |
| 2011/0252462 | A1 * | 10/2011 | Bonanno | H04L 63/02 726/14 |
| 2017/0063633 | A1 * | 3/2017 | Goliya | H04L 45/72 |
| 2017/0302535 | A1 * | 10/2017 | Lee | H04L 41/26 |
| 2018/0217879 | A1 * | 8/2018 | Garcia | G06F 11/0709 |
| 2018/0219743 | A1 * | 8/2018 | Garcia | H04L 41/0213 |
| 2019/0392150 | A1 * | 12/2019 | Shevade | G06F 9/5072 |
| 2020/0249926 | A1 | 8/2020 | Raja et al. | |
| 2021/0184953 | A1 * | 6/2021 | Huang | H04L 43/20 |
| 2022/0091903 | A1 * | 3/2022 | Bai | H04L 9/50 |
| 2022/0129296 | A1 * | 4/2022 | Okamoto | H04L 67/142 |
| 2022/0237017 | A1 | 7/2022 | Kim | |
| 2022/0278926 | A1 * | 9/2022 | Sharma | H04L 41/0803 |
| 2023/0099186 | A1 * | 3/2023 | Virtuoso | G06F 9/5072 718/1 |
| 2023/0106077 | A1 * | 4/2023 | Ji | H04L 43/0817 714/48 |
| 2023/0109109 | A1 * | 4/2023 | Wilson | H04L 9/0861 713/168 |
| 2023/0297404 | A1 * | 9/2023 | Shen | H04L 61/5084 718/1 |
| 2023/0308358 | A1 * | 9/2023 | Chitalia | G06F 9/5072 |
| 2023/0359508 | A1 | 11/2023 | Kalley et al. | |
| 2024/0311208 | A1 | 9/2024 | Kandasamy et al. | |
| 2024/0396844 | A1 * | 11/2024 | Shrivastava | H04L 45/74 |
| 2025/0028548 | A1 * | 1/2025 | Liu | G06F 9/45558 |
| 2025/0119422 | A1 * | 4/2025 | Dong | G06F 9/4862 |
| 2025/0247361 | A1 | 7/2025 | Wu et al. | |

FOREIGN PATENT DOCUMENTS

| | | | | |
|---|---|---|---|---|
| CN | 115134230 | A * | 9/2022 | H04L 41/0803 |
| CN | 115185628 | A | 10/2022 | |
| CN | 115391006 | A | 11/2022 | |
| WO | WO-2011073560 | A1 * | 6/2011 | H04L 63/10 |
| WO | 2020/238751 | A1 | 12/2020 | |
| WO | 2021/147288 | A1 | 7/2021 | |
| WO | 2022/026028 | A1 | 2/2022 | |

OTHER PUBLICATIONS

"Azure Kubernetes Service Tutorial: How to Integrate AKS with Azure Container Instances", Retrieved from https://bluexp.netapp.com/blog/azure-cvo-blg-azure-kubernetes-service-tutorial-integrate-aks-with-aci, Jan. 20, 2021, pp. 1-11.

"Container Service for Kubernetes Serverless", Retrieved from https://www.alibabacloud.com/en/product/ask ?_p_lc=1, Retrieved on Apr. 11, 2024, pp. 1-8.

"Create an unmanaged ingress controller", Retrieved from https://learn.microsoft.com/en-us/azure/aks/ingress-basic?tabs=azure-cli, Feb. 13, 2024, pp. 1-4.

"Create and configure an Azure Kubernetes Services (AKS) cluster to use virtual nodes in the Azure portal", Retrieved from https://learn.microsoft.com/en-us/azure/aks/virtual-nodes-portal, May 10, 2023, pp. 1-6.

"Virtual Kubelet—Run Pods Without Nodes", Retrieved from https://blog.qaware.de/posts/virtual-kubelet/, Jul. 12, 2018, pp. 1-3.

Davidson et al., "Running AWS Fargate with virtual-kubelet", Retrieved from https://aws.amazon.com/blogs/opensource/aws-fargate-virtual-kubelet/, May 1, 2018, pp. 1-12.

Gokul C., "Kubernetes Virtual Clusters—Enabling Hard Multi-Tenancy and Cost Optimization", Retrieved from https://www.linkedin.com/pulse/kubernetes-virtual-clusters-enabling-hard-cost-gokul-chandra?trk=article-ssr-frontend-pulse_more-articles_related-content-card, May 6, 2021, pp. 1-18.

Gokul C., "Virtual Kubelet and Managing IoT Edge Devices with Azure Kubernetes Service (AKS)", Retrieved from https://www.linkedin.com/pulse/virtual-kubelet-managing-iot-edge-devices-azure-service-gokul-chandra, Mar. 28, 2019, pp. 1-8.

Wakayama K., "Serverless Kubernetes with Azure AKS and ACI", Retrieved from https://codersociety.com/blog/articles/kubernetes-aks-aci, Oct. 10, 2022, pp. 1-12.

Yenel A., "Distributed Execution of Unikernel Applications on Container Orchestration Platform Kubernetes for IoT Scenarios", Jan. 15, 2020, pp. 64.

* cited by examiner

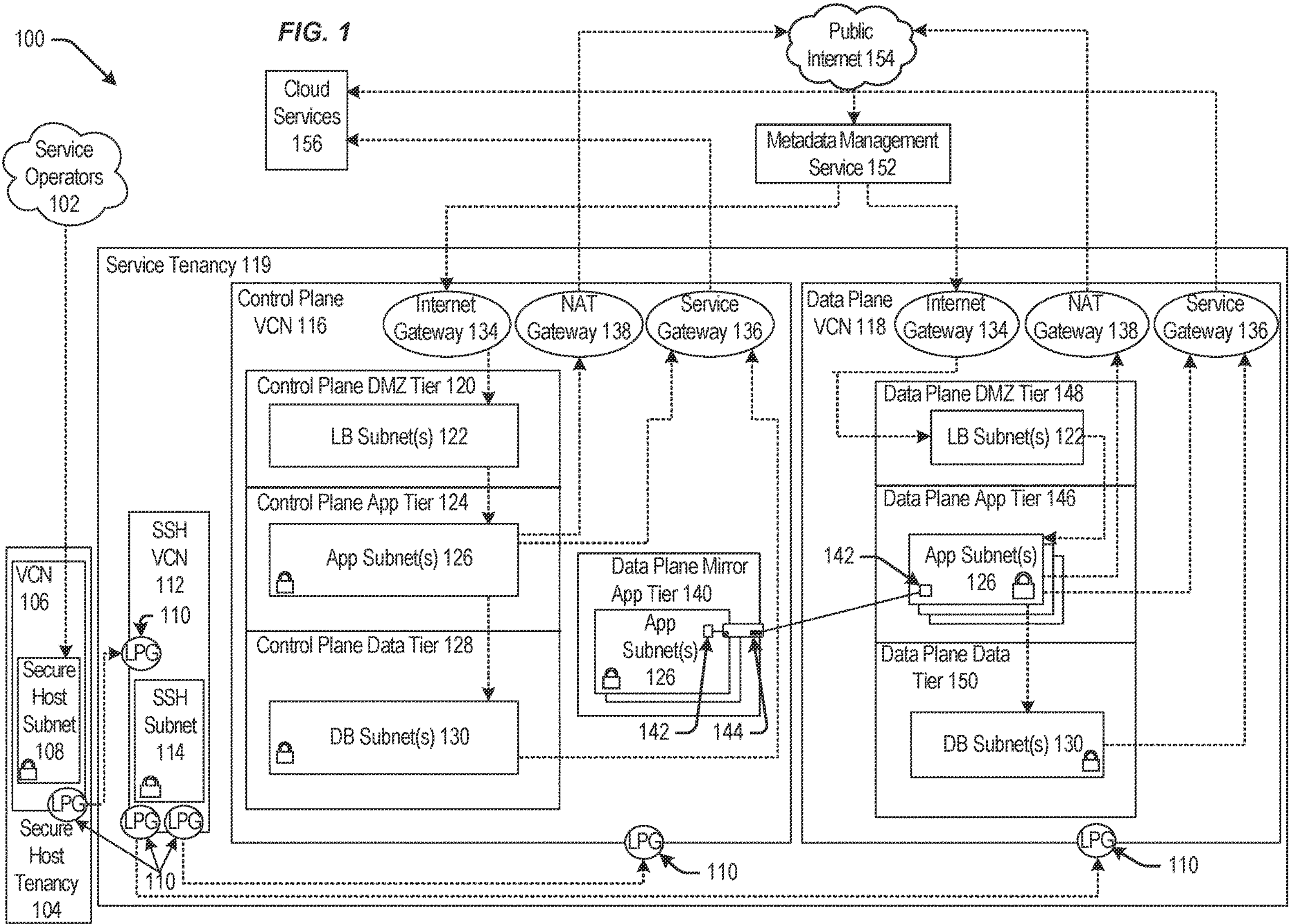

100
FIG. 1
Service Operators 102
Cloud Services 156
Public Internet 154
Metadata Management Service 152
Service Tenancy 119
Control Plane VCN 116
Internet Gateway 134
NAT Gateway 138
Service Gateway 136
Control Plane DMZ Tier 120
LB Subnet(s) 122
Control Plane App Tier 124
App Subnet(s) 126
Control Plane Data Tier 128
DB Subnet(s) 130
Data Plane Mirror App Tier 140
App Subnet(s) 126
142
144
Data Plane VCN 118
Internet Gateway 134
NAT Gateway 138
Service Gateway 136
Data Plane DMZ Tier 148
LB Subnet(s) 122
Data Plane App Tier 146
142
App Subnet(s) 126
Data Plane Data Tier 150
DB Subnet(s) 130
VCN 106
Secure Host Subnet 108
Secure Host Tenancy 104
SSH VCN 112
110
SSH Subnet 114
LPG
110

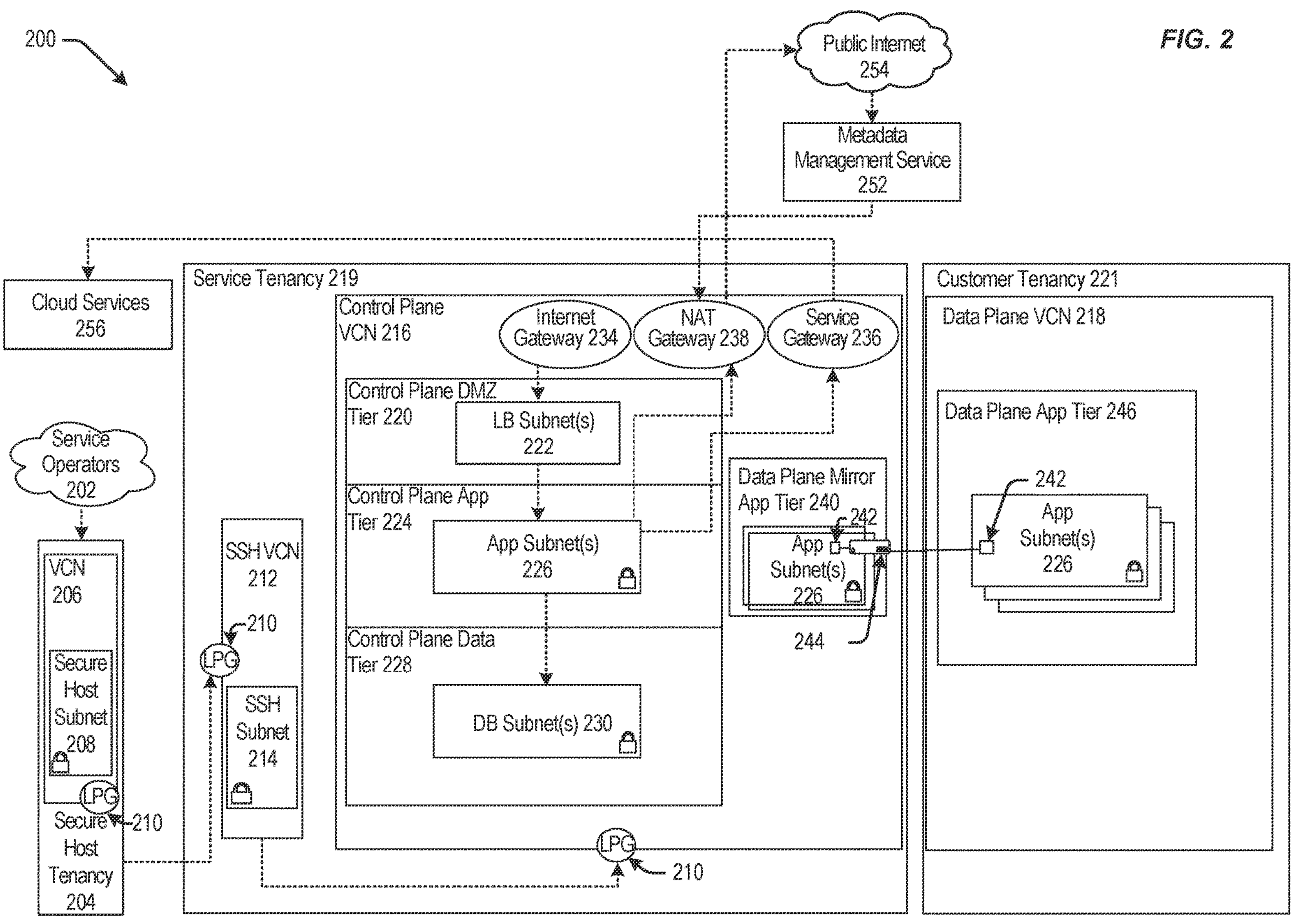
FIG. 2
200
Public Internet 254
Metadata Management Service 252
Cloud Services 256
Service Operators 202
VCN 206
Secure Host Subnet 208
LPG
210
Secure Host Tenancy 204
Service Tenancy 219
SSH VCN 212
SSH Subnet 214
Control Plane VCN 216
Internet Gateway 234
NAT Gateway 238
Service Gateway 236
Control Plane DMZ Tier 220
LB Subnet(s) 222
Control Plane App Tier 224
App Subnet(s) 226
Control Plane Data Tier 228
DB Subnet(s) 230
Data Plane Mirror App Tier 240
242
244
Customer Tenancy 221
Data Plane VCN 218
Data Plane App Tier 246

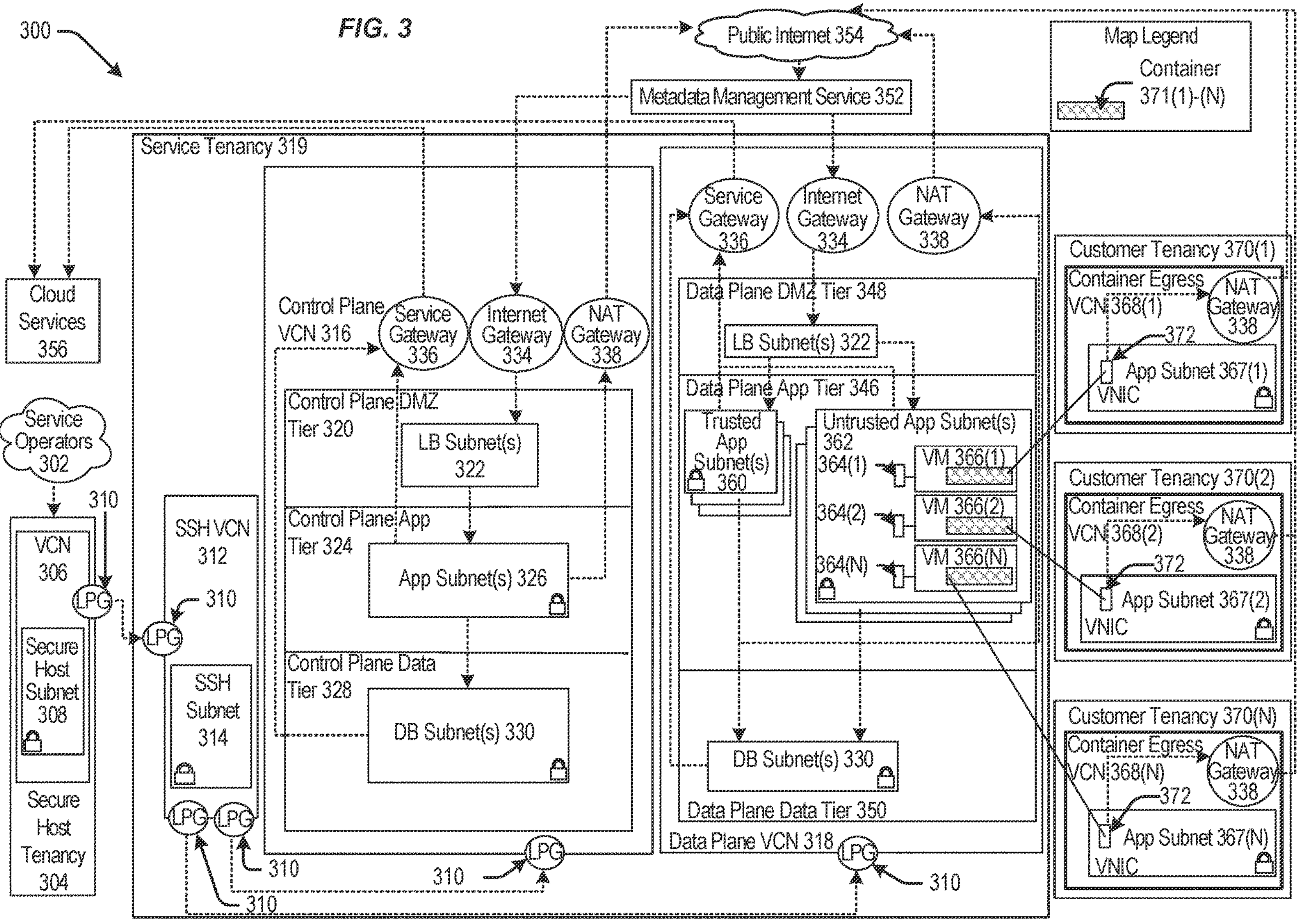
FIG. 3
300
Cloud Services 356
Service Operators 302
VCN 306
Secure Host Subnet 308
Secure Host Tenancy 304
LPG
310
Service Tenancy 319
SSH VCN 312
SSH Subnet 314
Control Plane VCN 316
Control Plane DMZ Tier 320
Control Plane App Tier 324
Control Plane Data Tier 328
Service Gateway 336
Internet Gateway 334
NAT Gateway 338
LB Subnet(s) 322
App Subnet(s) 326
DB Subnet(s) 330
Public Internet 354
Metadata Management Service 352
Data Plane VCN 318
Data Plane DMZ Tier 348
Data Plane App Tier 346
Data Plane Data Tier 350
Trusted App Subnet(s) 360
Untrusted App Subnet(s) 362
364(1)
364(2)
364(N)
VM 366(1)
VM 366(2)
VM 366(N)
Map Legend
Container 371(1)-(N)
Customer Tenancy 370(1)
Customer Tenancy 370(2)
Customer Tenancy 370(N)
Container Egress VCN 368(1)
Container Egress VCN 368(2)
Container Egress VCN 368(N)
App Subnet 367(1)
App Subnet 367(2)
App Subnet 367(N)
VNIC
372

CROSS-TENANCY RESOURCE ASSOCIATION FOR CONTAINER ORCHESTRATION SYSTEM

INCORPORATION BY REFERENCE; DISCLAIMER

Each of the following applications are hereby incorporated by reference: Application No. 63/564,247 filed on Mar. 12, 2024. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to container orchestration systems. In particular, the present disclosure relates to virtual agents for container orchestration systems.

BACKGROUND

Container orchestration is the process of automating the deployment, scaling, and management of containerized applications. Containers allow developers to package an application and its dependencies into a single unit to ensure consistency across different environments. Container orchestration involves automating the provisioning, deployment, networking, scaling, availability, and lifecycle management of containers. Container orchestration helps to simplify the process of deploying and managing containers, especially when dealing with large-scale applications. Kubernetes is currently the most popular container orchestration platform and is widely used by leading public cloud providers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 1-4 are block diagrams illustrating patterns for implementing a cloud infrastructure as a service system in accordance with one or more embodiments;

DETAILED DESCRIPTION

Figure 4:
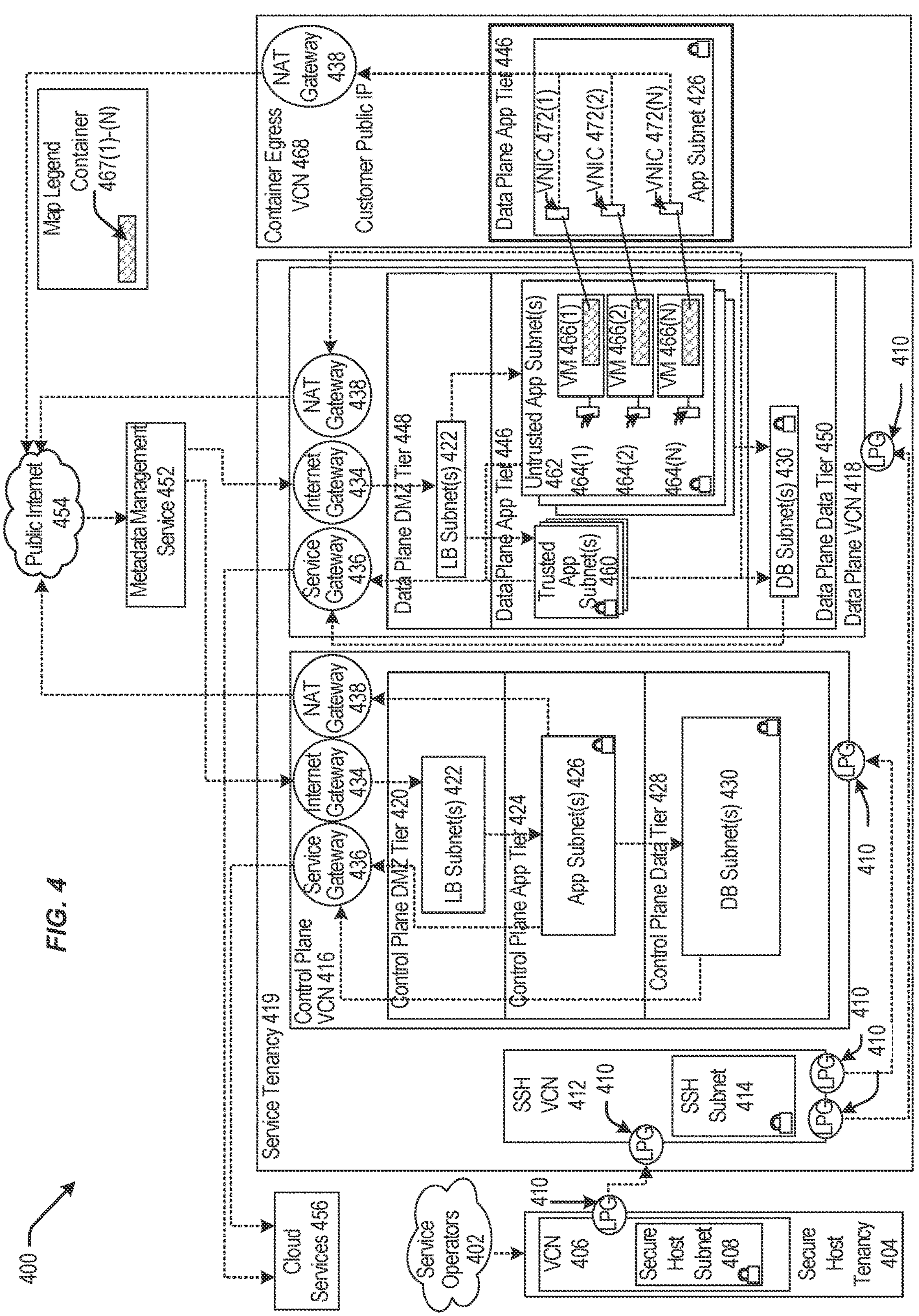

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CLOUD COMPUTING TECHNOLOGY
3. COMPUTER SYSTEM
4. CROSS-TENANCY RESOURCE ASSOCIATION ARCHITECTURE
5. VERIFYING REQUESTS BASED ON SUBNETS ASSOCIATED WITH A REQUESTING VIRTUAL NODE AND A TARGET CONTAINER INSTANCE
6. EXAMPLE EMBODIMENT
7. PRACTICAL APPLICATIONS, ADVANTAGES & IMPROVEMENTS
8. MISCELLANEOUS; EXTENSIONS

1. GENERAL OVERVIEW

A virtual agent executes on a virtual node of a container orchestration system and is assigned a corresponding subnet. The virtual node may include pods executing on the container instance. Additionally, or alternatively, the virtual agent executes as a virtual kubelet used in a Kubernetes cluster and/or another container orchestration system. The virtual agent transmits a request, corresponding to a container instance, to a container instance control plane.

One or more embodiments permit or deny requests, received from a virtual agent at a container instance control plane, based on whether a subnet assigned to the virtual agent matches a subnet associated with a container instance corresponding to the request. The system may determine the subnet assigned to the virtual agent based on a Resource Principal Session Token (RPST) for a session during which the request is received from the virtual agent. The system may determine whether the subnet assigned to the virtual agent matches the subnet associated with the container instance by executing a policy that references the RPST.

In an embodiment, the system identifies the subnet assigned to the virtual agent based on an identity principal corresponding to the virtual agent. The system then generates the RPST using the determined subnet assigned to the virtual agent.

One or more embodiments described in this Specification and/or recited in the claims may not be included in this General Overview section.

2. CLOUD COMPUTING TECHNOLOGY

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling Operating System (OS), middleware, and/or application deployment e.g., on self-service virtual machines that can be spun up on demand.

In some examples, IaaS provisioning may refer to acquiring computers or virtual hosts for use and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices that may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers executing any of a variety of commercially-available UNIX® or UNIX-like operating systems, including without limitation the variety of GNU/Linux operating systems, such as for example, Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124. The LB subnet(s) 122 may further be communicatively coupled to an Internet gateway 134 that can be contained in the control plane VCN 116. The app subnet(s) 126 can be communicatively coupled to the DB subnet(s) 130 contained in the control plane data tier 128, a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The service gateway 136 can make API calls to cloud services 156, and cloud services 156 can send requested data to the service gateway 136.

In some examples, the secure host tenancy 104 can be directly connected to the service tenancy 119 that may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118. The data plane mirror app tier 140 of the control plane VCN 116 can communicate with the data plane app tier 146 of the data plane VCN 118 via VNICs 142. VNICs 142 can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configurations of resources contained in the data plane VCN 118.

In some embodiments, the control plane VCN 116 and the data plane VCN 118 can be contained in the service tenancy 119. The user, or the customer, of the system may be restricted from owning or operating either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users' or other customers' resources. Also, this embodiment may allow users or customers of the system to store databases privately without needing to rely on public Internet 154 that may not have a desired level of threat prevention for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119 that may be isolated from public Internet 154.

FIG. 2 is a block diagram illustrating another example pattern of an IaaS architecture 200, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1). The Internet gateway 234 can be contained in the control plane VCN 216. Additionally, the app subnet(s) 226 can be communicatively coupled to the DB subnet(s) 230 contained in the control plane data tier 228, a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218, contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in Region 1, and cloud service Deployment 1 may be located in Region 1 and in Region 2. If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316. Additionally, the app subnet(s) 326 can be communicatively coupled to the DB subnet(s) 330 contained in the control plane data tier 328, to a service gateway 336 (e.g., the service gateway of FIG. 1), and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to execute that may be destructive, may communicate with other customer resources, or may otherwise cause undesirable effects. In response to this, the IaaS provider may determine whether to execute code given to the IaaS provider by the customer.

In some examples, the customer of the IaaS provider may grant temporary network access to the IaaS provider and request a function to be attached to the data plane app tier 346. Code to execute the function may be executed in the VMs 366(1)-(N), and the code may not be configured to execute anywhere else on the data plane VCN 318. Each VM 366(1)-(N) may be connected to one customer tenancy 380. Respective containers 381(1)-(N) contained in the VMs 366(1)-(N) may be configured to execute the code. In this case, there can be a dual isolation (e.g., the containers 381(1)-(N) executing code, where the containers 381(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of executing the code, the IaaS provider may kill or otherwise dispose of the containers 381(1)-(N).

In some embodiments, the trusted app subnet(s) 360 may execute code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may execute code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1). The SSH VCN 412 can be communicatively coupled to a control plane VCN 416 (e.g., the control plane VCN 116 of FIG. 1) via an LPG 410 contained in the control plane VCN 416. The SSH VCN 412 can be communicatively coupled to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424. The LB subnet(s) 422 can be communicatively coupled to an Internet gateway 434 (e.g., the Internet gateway 134 of FIG. 1) that can be contained in the control plane VCN 416. The app subnet(s) 426 can be communicatively coupled to the DB subnet(s) 430 contained in the control plane data tier 428, a service gateway 436 (e.g., the service gateway of FIG. 1), and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can execute code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3. The pattern illustrated by the architecture of block diagram 400 of FIG. 4 may be implemented for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may execute code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use the same network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with the same tenant ID.

In an embodiment, each tenant is associated with a tenant ID. Each application, implemented by the computer network, is tagged with a tenant ID. Additionally, or alternatively, each data structure and/or dataset stored by the computer network is tagged with a tenant ID. A tenant is permitted access to a particular application, data structure, and/or dataset only if the tenant and the particular application, data structure, and/or dataset are associated with the same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates the tenants that have authorization to access an application. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

4. COMPUTER SYSTEM

Figure 5:
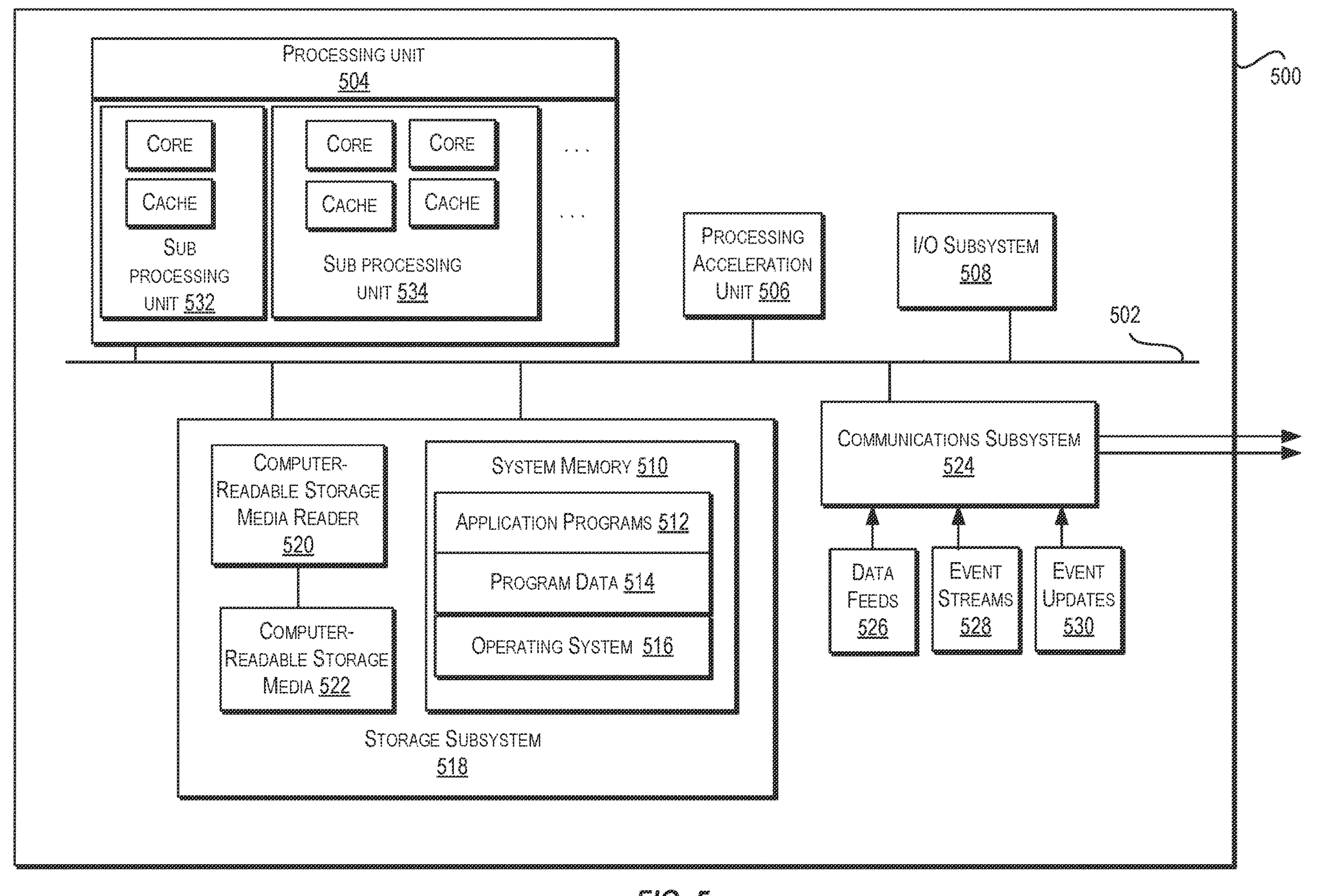
FIG. 5 is a hardware system in accordance with one or more embodiments.

FIG. 5 illustrates an example computer system 500, where various embodiments may be implemented. The system 500 may be used to implement any of the computer systems described above. As shown in FIG. 5, computer system 500 includes a processing unit 504 that communicates with several peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. The PCI bus can be implemented as a Mezzanine bus manufactured to the IEEE P1386.1 standard.

Processing unit 504 that can be implemented as one or more integrated circuits (e.g., a conventional microprocessor or microcontroller) controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some of the program code to be executed can be resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator) through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics, and audio/video information such as monitors, printers, speakers, headphones, automotive navigation systems, plotters, voice output devices, and modems.

Computer system 500 may comprise a storage subsystem 518 that provides a tangible, non-transitory, computer-readable storage medium for storing software and data constructs that provide the functionality of the embodiments described in this disclosure. The software can include programs, code modules, instructions, scripts, etc., that when executed by one or more cores or processors of processing unit 504, provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations, where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.). Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams that may include event streams 528 of real-time events and/or event updates 530 that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. RESOURCE ASSOCIATION ARCHITECTURE

A detailed example is described below for purposes of clarity. Components and/or operations described below should be understood as one specific example and may not be applicable to certain embodiments. Accordingly, components and/or operations described below should not be construed as limiting the scope of any of the claims.

Figure 6:
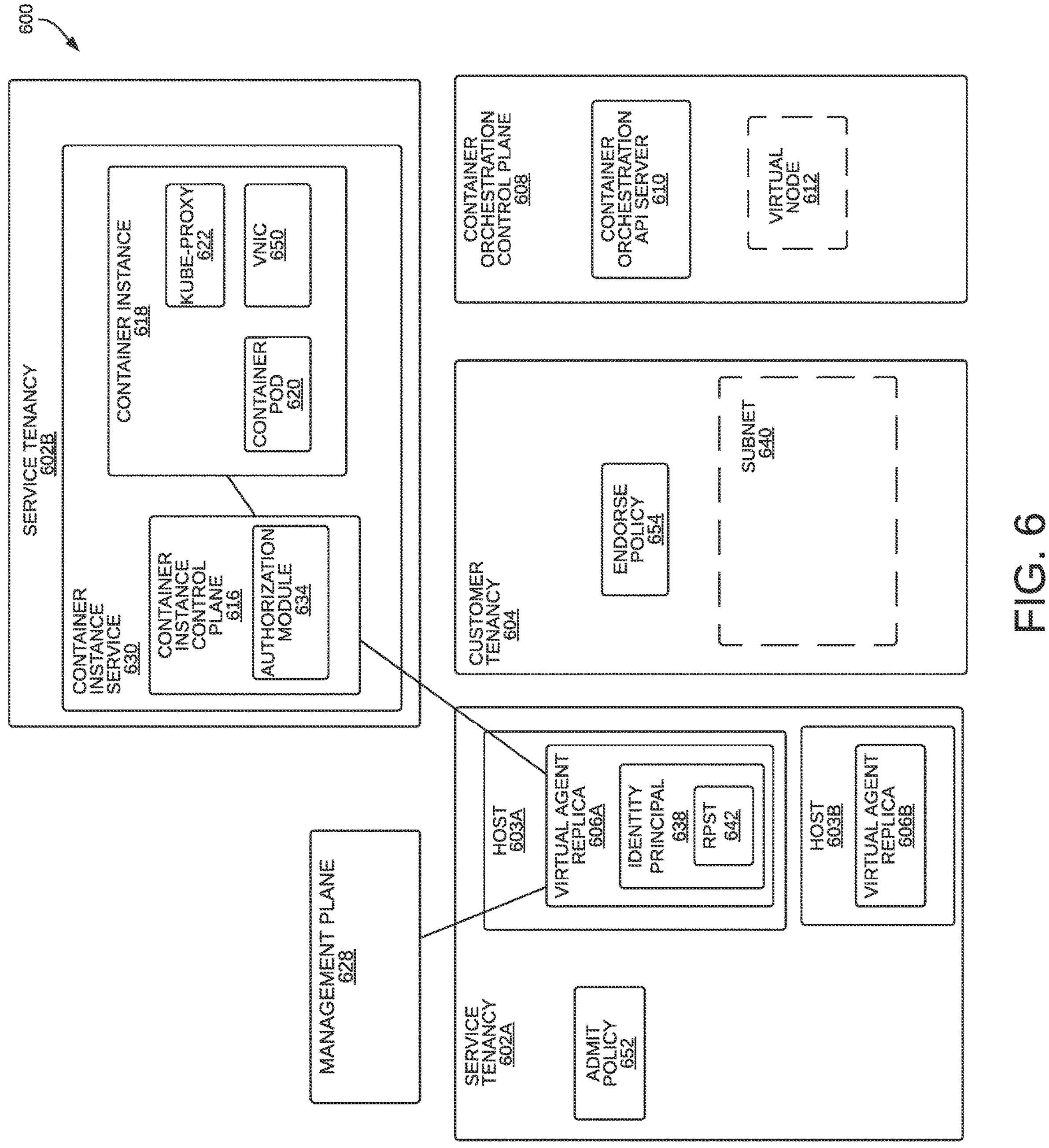
FIG. 6 illustrates a system in accordance with one or more embodiments.

FIG. 6 illustrates a system 600 in accordance with one or more embodiments. As illustrated in FIG. 6, system 600 includes service tenancy 602A and 602B, customer tenancy 604, hosts 603A and 603B, virtual nodes including a virtual agent (virtual agent replicas 606A and 606B) and container pod 620, container orchestration control plane 608, container orchestration API server 610, VNIC 650, container instance service 630, container instance control plane 616, management plane 628, authorization module 634, policies including admit policy 652 and endorse policy 654, identity principal 638, subnet 640, RPST 642, container instance 618, and kube-proxy 622.

In one or more embodiments, system 600 may include more or fewer components than the components illustrated in FIG. 6. The components illustrated in FIG. 6 may be local to or remote to the others. The components illustrated in FIG. 6 may be implemented in software and/or hardware. Components may be distributed over multiple applications and/or machines. Multiple components may be combined into one application and/or machine. Operations described with respect to one component may instead be performed by another component.

In accordance with an embodiment, a tenancy is a secure and isolated partition within a cloud system that allows a tenant to create, organize, and administer their cloud resources. In one or more embodiments, a tenancy is a hierarchical collection of compartments, where the root compartment is the tenancy. A tenant, or customer, is a party with a tenancy in the cloud system. A cloud system includes multiple tenancies that are isolated from one another. A cloud network manager is the manager for one or more tenants or customers in a cloud network such as an owner or renter of the cloud network.

In accordance with an embodiment, service tenancies 602A and 602B are tenancies under the control of the cloud network manager. Components in service tenancies, such as virtual agents (virtual agent replicas 606A and 606B), are version patched under the control of the cloud network without requiring a request from the customer. Furthermore, the components in the service tenancies are protected using cloud network security.

In accordance with an embodiment, customer tenancy 604 is a tenancy under the control of the customer. Customer tenancy 604 contains a customer network such as a customer network for a container orchestration cluster. In FIG. 6, service tenancies 602A and 602B and customer tenancy 604 are implemented within the same cloud environment and configured to execute operations corresponding to a data set associated with the customer. In an example, the data set defines a container orchestration cluster such as a Kubernetes cluster.

In one or more embodiments, subnet 640 is part of customer tenancy 604. Subnets segment a network into smaller, isolated portions. Subnets are allocated a portion of the total address space. Subnets provide isolation between different components or services. Subnets ensure tenants' isolation and efficient resource management. Subnets define security boundaries, allowing fine-grained control over access.

In accordance with an embodiment, hosts 603A and 603B are separate computers or devices that connect to the network. Hosts 603A and 603B are in different fault domains. A fault domain is a group of nodes that share physical infrastructure. In an example, a particular node is associated with one or more fault domains, including regions (e.g., a geographical area, such as a city), availability zones (partitioning within a region with dedicated power and cooling), or other fine-grained partitioning of a physical infrastructure (e.g., a semi-isolated rack within a data center).

In accordance with an embodiment, a container orchestration system provides a runtime for containerized workloads and services. Examples of container orchestration systems include Kubernetes and Docker Swarm. A container orchestration environment is an instance of a container orchestration system. A specific Kubernetes cluster or a specific Docker Swarm instance are examples of container orchestration environments.

In accordance with an embodiment, a container orchestration implementation provider is an implementation provider for a particular type of container orchestration system. Examples of container orchestration implementations include Oracle Container Engine for Kubernetes (OKE) and Amazon Elastic Kubernetes Service (EKS); both provide container orchestration implementations (i.e., are vendors) for Kubernetes.

In accordance with an embodiment, a container orchestration node is a virtual or physical machine in a container orchestration cluster. A control plane manages the container orchestration nodes and contains the services necessary to execute containers or pods. For a Kubernetes cluster, the container orchestration node is a Kubernetes node. Components on a container orchestration node in Kubernetes include a kubelet, a container runtime, and a kube-proxy. A container orchestration node is an individual bare metal machine or virtual machine (VM), where containers are scheduled to execute within a container orchestration environment, for example, as part of a Kubernetes cluster or Docker Swarm instance.

In accordance with an embodiment, a container orchestration agent executes on container orchestration nodes and is responsible for communications between the container orchestration control plane and the node where the workload is executed. In Kubernetes, the container orchestration agent is a kubelet.

In accordance with an embodiment, a virtual node 612 is a container orchestration node implemented on multiple hosts, computers, or devices. A virtual agent is a container orchestration agent for virtual node 612. The virtual agent is executed on a host, computer, or device different than containers for the virtual node 612. The virtual agent interacts with containers such as containers in pod 620 at container instance 618. The virtual agent and the containers execute at separate locations within the virtual node 612.

In accordance with an embodiment, virtual agent replicas 606A and 606B are replicas of a virtual agent for a virtual node 612. Multiple virtual agent replicas 606A and 606B allow the virtual node to be operated in a high availability manner. Virtual agent replicas 606A and 606B are executed on different hosts, such as hosts 603A and 603B, on different fault domains to provide for high availability for the virtual agent and virtual node 612. For example, if virtual agent replica 606A fails, virtual agent replica 606B maintains operation as a virtual agent in the virtual node 612. Virtual agents provide customers with the ability to deploy containerized applications without having to manage the data plane infrastructure. Thus, the virtual agent reduces the operational burden on the customer.

In accordance with an embodiment, a container instance, such as container instance 618, is a virtual machine that executes a containerized application in a cloud system. A container instance provides the benefits of a traditional VM instance, such as CPU and memory resources. The container instance uses a standardized and/or reduced functionality for containers. In FIG. 6, container instance 618 includes container pod 620 and kube-proxy 622.

In accordance with an embodiment, container pods, such as container pod 620, execute containers scheduled on a virtual node 612. A Kubernetes pod is a group of one or more containers with shared storage and network resources and a specification for how to execute the containers. In FIG. 6, container pod 620 is part of a single virtual node 612 along with virtual agent replicas 606A and 606B.

In accordance with an embodiment, kube-proxy 622 performs stream forwarding and includes other functions, such as filtering content, scanning for malware, masking the origin of the requests, and encryption. Kube-proxy 622 is a Kubernetes network kube-proxy that executes on Kubernetes nodes and includes functionality for simple TCP, UDP, and SCTP stream forwarding or round robin TCP, UDP, and SCTP forwarding. Kube Proxy 622 routes traffic headed to container orchestration service endpoints. In an example, a virtual node 612 uses multiple container instances in different locations, so multiple kube-proxies are used in a single virtual node 612, and multiple container instances contain a kube proxy as a sidecar. Containers in a container instance share the same network namespace and, in that case, two containers in a container instance cannot use the same port.

In accordance with an embodiment, a Virtual Network Interface Card (VNIC) enables elements to connect to a cloud network in a cloud environment. A VNIC is an abstraction for one or more physical Network Interface Cards (NICs) in the cloud network. An NIC, also known as a network adapter, LAN adapter, or physical network interface is a computer hardware component that connects computers to a computer network.

In an embodiment, VNIC 650 created at container instance 618 restricts container pod 620 to subnet 640. VNIC 650 attaches container pod 620 to the customer's network at customer tenancy 604.

In one embodiment, the system provides security services for virtual nodes. Customers create virtual nodes using container orchestration API server 610. Virtual agents, such as virtual agent replicas 606A and 606B, execute customer workloads (such as using container pod 620) on container instances such as container instance 618.

In one embodiment, virtual agents are container processes that execute on service tenancy 602A owned by compute instances, such as hosts 603A and 603B. The virtual agent registers as a worker node with the corresponding container orchestration cluster by invoking container orchestration API server 610.

In one embodiment, when a customer deploys a workload to virtual node 612 using container orchestration API server 610 with the cluster's API server endpoint, the virtual agent launches container instance 618 by invoking container instance control plane 616. In one example, container instance 618 is not exposed to customers.

In one embodiment, virtual agents create, read, and delete container instances by invoking Container Instance Control Plane APIs. Since such container instances are hidden from customers, the system restricts customers from writing any policies that expose container instances. To authenticate with Container Instance Control Plane 616, the system uses identity principal 638.

In accordance with an embodiment, identity principal 638 is a unique identifier assigned an element in system 600 used to specify the resources that the element is able to access. Virtual agent replica 606A obtains identity principal 638 (also called virtual agent resource principal) from management plane 628. In one embodiment, identity principal 638 is an internal only resource principal of type, such as "virtualnode", to represent virtual agents for authentication and authorization. Identity principal 638 includes an indication of a subnet that the virtual agent is associated with.

In accordance with an embodiment, virtual agents, such as virtual agent replicas 606A and 606B, are customer-owned resources. Identity principal 638 represents customer tenancy identified by the virtual agent's associated subnet or compartment. Container instance 618 is owned by service tenancy 602B, but the network (subnet 640) attached to the instance belongs to customer tenancy 604. The system uses a cross-tenancy resource association between container-instance resource, subnet resource, and/or network security group resource.

In accordance with an embodiment, a resource principal session token (RPST) 642 is a time limited token obtained from the system and represents the identity principal 638. The system uses the RPST 642 to sign requests to cloud services. RPST 642 is used to authenticate requests to specified services based on defined policies.

In accordance with an embodiment, management plane 628 configures and manages parts of the system, including virtual agent replicas 606A and 606B. In one example, Management plane 628 provides RPST 642 to virtual agent replica 606A.

In accordance with an embodiment, authentication ensures that elements, such as virtual agent replica 606A, have the correct identity. Authentication includes methods like passwords, one-time pins (OTPs) authentication apps that generate security codes, and multi-factor authentication (MFA).

In accordance with an embodiment, authorization module 634 grants permission to access specific resources or functions based on their authenticated identity. Examples of authorization include Role-Based Access Control (RBAC), Attribute-Based Access Control (ABAC), Discretionary Access Control (DAC), Mandatory Access Control (MAC) and OAuth.

In accordance with an embodiment, policies are a set of conditions, constraints, and settings that determine who is authorized to access a resource or connect to a network. Policies control access to network resources and ensuring security.

In accordance with an embodiment, authorization module 634 uses policies, such as admit policy 652 and endorse policy 654, to authorize requests from virtual agents concerning container instances. The system uses cross-tenancy policies, such as admit policy 652 and endorse policy 654, for container instance management (including resource association). Service tenancy 602A writes admit policy 652. Admit policy 652 includes a virtual agent identifier and a subnet identifier. Admit policy 652 associates the virtual agent identifier and the subnet identifier, so that CRUD requests for a container instance from the virtual agent customer tenancy are accepted if the correct subnet is indicated in the request.

In accordance with an embodiment, admit policy 652 indicates that virtual agent replica 606A is allowed to modify container instance 618 if the request indicates the correct subnet identifier for the container instance 618. Alternately, or in combination, the admit policy 652 indicates the virtual agent replica 606A is allowed to modify container instance 618 if a network security group also matches.

In accordance with an embodiment, the system also uses endorse policy 654 written in the customer tenancy 604. In one embodiment, endorse policy 654 is of the same form as admit policy. Endorse policy 654 indicates the customer tenancy's endorsement of the actions of virtual agent principle 606A. In one example, the customer tenancy automatically writes endorse policy 654 when a virtual agent is created by customer request.

In accordance with an embodiment, the system tags container instances and containers created by virtual agent replica 606A with a virtual node identifier that matches identity principal 638 (resource principal identifier) of a virtual agent. Authorization module 634 ensures, using admit policy 652 and/or endorse policy 654, that a CRUD request from a virtual agent for container instance will succeed if the container instance is tagged with a virtual node identifier for that virtual agent.

In accordance with an embodiment, the system secures operations on container instance 618, such as those operations requested by CRUD requests including Get/Delete/RetrieveLogs/ExecuteContainer operations, by adding a clause to match the resource principal identifier, such as identity principal 638, with the tag. To ensure that a resource principal is limited to creating a container instance associated with one subnet, the system injects an identity claim such as "subnet", into the resource principal session token (RPST) 642 used in the association policy clause.

In accordance with an embodiment, container orchestration control plane 608 acts as the control plane for a container orchestration cluster. In Kubernetes, a Kubernetes control plane makes global decisions about the cluster, including scheduling, detecting cluster events, and responding to cluster events (for example, starting up new pods).

In accordance with an embodiment, container orchestration API server 610 exposes an API to allow users to control the cluster. In Kubernetes, the Kubernetes API server is a component of the Kubernetes control plane that exposes the Kubernetes API and is the front end for the Kubernetes control plane. The Kubernetes API is a resource-based (RESTful) programmatic interface provided via HTTP. The Kubernetes API supports retrieving, creating, updating, and deleting primary resources via the standard HTTP verbs (POST, PUT, PATCH, DELETE, GET).

In accordance with an embodiment, container instance service 630 is a service that contains container instance control plane 616 and container instance 618. Container instance service 630 creates and maintains container instances such as container instance 618. Container instance service 630 provides a serverless compute service that enables users to quickly and easily run containers without managing servers. Container instance service 630 runs containers on serverless compute optimized for container workloads with isolation between container instances. Container instance service 630 simplifies the container deployment process for developers.

In accordance with an embodiment, container instance control plane 616 is a layer that handles tasks for container instances. Container instance control plane 616 configures network devices, allocates IP addresses, manages network security, and creates and distributes routing policies.

In accordance with an embodiment, control plane APIs create a virtual node pool, defined as a collection of virtual nodes including virtual agents. Customers interact with the container orchestration cluster using container orchestration API server 610. Customers create pods, such as container pod 620, for virtual node 612 by storing an update using container orchestration API server 610. The virtual agent of the virtual node 612 obtains information from container orchestration API server 610 and provision containers for the pod, such as container pod 620, at container instances such as container instance 618. Customers retrieve logs from a pod using the virtual agent.

In accordance with an embodiment, the virtual agent generates a container instance 618 for container pod 620 scheduled on the virtual node 612. A service tenancy executes container instance 618. The container instance 618 is invisible to customers, but the customer network connects to container pod 620 in container instance 618. For example, customers access applications executing in a pod of a container instance using the pods IP address in the customer network.

In accordance with an embodiment, the virtual agent (such as virtual agent replicas 606A and 606B) includes a node controller responsible for registering the virtual agent with the container orchestration API server and periodically heart-beating its status. Additionally, or alternatively, the virtual agent includes a pod controller responsible for managing the pods scheduled on the virtual node 612 by provisioning container instances. Additionally, or alternatively, the virtual agent includes a virtual agent API server that implements APIs for extracting container logs and executing remote commands on containers.

In one embodiment, one of the virtual agent replicas 606A or 606B, called a leader replica, executes the node controller and manages container instances. The other replica, called a follower replica, responds to container orchestration requests and acts as a backup. In one example, Kubernetes Leader Election library, a standard Kubernetes feature that uses lease objects, is used for leader election. In one or more embodiments, the lease object is marked as a child of a node object, so it is cleaned up when the node containing the leader replica is deleted.

In one or more embodiments, the virtual agents use credentials provided by management plane 628. The provided certificates include a client certificate to communicate with container orchestration API server for registering nodes, updating node status, retrieving pod information, and updating pod status as well as a server certificate. The virtual agent is provided with a server certificate, signed by cluster certificate authority, by management plane 628. Container orchestration API server verifies this certificate to ensure that the server certificate is signed by cluster certificate authority to establish trust. Management plane 628 also provides the virtual agent with a client certificate signed by the cluster certificate authority.

In an embodiment, the system ensures that virtual agents execute the right version using a transparent upgrade. The system implements a rolling upgrade of virtual agent replicas 606A and 606B without any downtime to customers. The upgrades include upgrades necessitated by container orchestration version upgrade. Customers trigger a container orchestration version upgrade on a cluster using a control plane API to automatically upgrade virtual agents in the cluster if required. The upgrades also include routine bug fixes and enhancements deployed automatically in the background.

In one or more embodiments, a data repository stores the data and configuration of system 600. The data repository may be any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as system 600. Additionally, or alternatively, a data repository may be implemented or executed on a computing system separate from system 600. The data repository may be communicatively coupled via a direct connection or via a network. Information describing system 600 may be implemented across any of the components within the system 600.

In one or more embodiments, service tenancy 602A and 602B, customer tenancy 604, hosts 603A and 603B, virtual nodes including a virtual agent (virtual agent replicas 606A and 606B) and container pod 620, container orchestration control plane 608, container orchestration API server 610, VNIC 650, container instance service 630, container instance control plane 616, management plane 628, authorization module 634, policies including admit policy 652 and endorse policy 654, identity principal 638, subnet 640, RPST 642, container instance 618, and kube-proxy 622 refer to hardware and/or software configured to perform operations described herein for container orchestration. Examples of operations for container orchestration are described below with reference to FIGS. 7 and 8.

In an embodiment, service tenancy 602A and 602B, customer tenancy 604, hosts 603A and 603B, virtual node 612 including a virtual agent (virtual agent replicas 606A and 606B) and container pod 620, container orchestration control plane 608, container orchestration API server 610, VNIC 650, container instance service 630, container instance control plane 616, management plane 628, authorization module 634, policies including admit policy 652 and endorse policy 654, identity principal 638, subnet 640, RPST 642, container instance 618, and kube-proxy 622 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

5. VERIFYING REQUESTS BASED ON SUBNETS ASSOCIATED WITH A REQUESTING VIRTUAL NODE AND A TARGET CONTAINER INSTANCE

Figure 7:
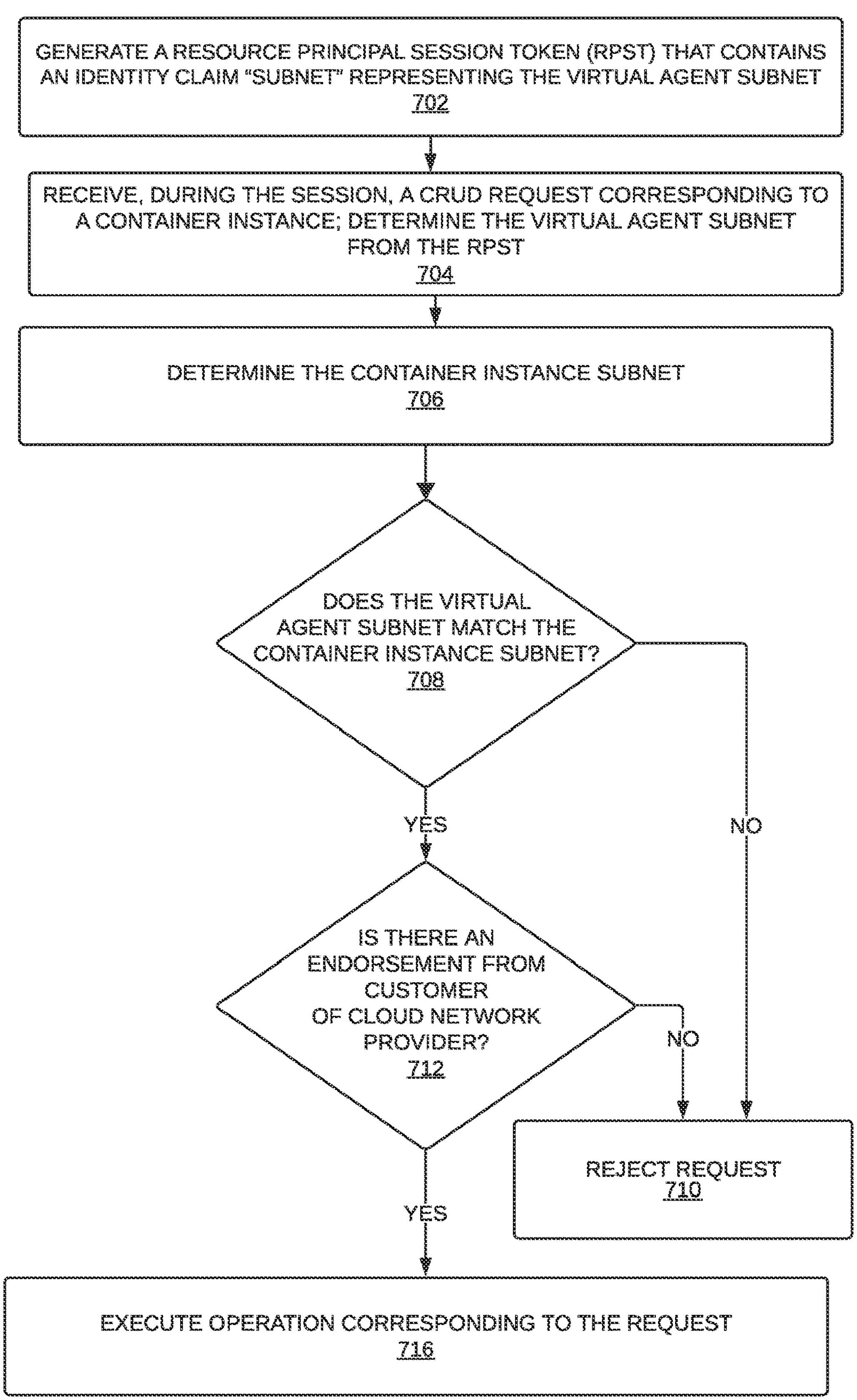
FIG. 7 illustrates an example set of operations using a subnet to evaluate requests from a virtual agent in accordance with one or more embodiments.

FIG. 7 illustrates an example set of operations using a subnet to evaluate requests from a virtual agent in accordance with one or more embodiments. One or more operations illustrated in FIG. 7 may be modified, rearranged, or omitted. Accordingly, the particular sequence of operations illustrated in FIG. 7 should not be construed as limiting the scope of one or more embodiments.

In accordance with an embodiment, requests made using a virtual agent are treated as a request coming from a customer's tenancy, while the container instances are in a service tenancy. The system does a cross-tenancy resource association to enable the virtual agent to operate on the container instance. When created, the container instance from service tenancy is associated with a VNIC and subnet in the customer's tenancy. The VNIC attaches the container pod to the customer's network. The system associates resources from different tenancies as a cross-tenancy resource association.

In accordance with an embodiment, the system creates a virtual agent principal token (identity principal) with a subnet identifier. When the customer's administrator creates a virtual agent or a pool of virtual agents, an indication of the subnet is associated with the virtual agent. The customer is authorized to create the virtual agent or virtual agent pool if the customer is authorized to access the subnet and authorized to create a virtual agent. If authorized, the management plane creates a virtual agent and the resource principal for the virtual agent.

In accordance with an embodiment, when the management plane creates the identity principal, the management plane adds subnet information into the token as a custom claim called subnet id.

In an embodiment, the system generates a resource principal session token (RPST) that contains an identity claim "subnet" representing the virtual agent subnet (Operation 702). The system creates a virtual agent for a subnet, and the identity principal of a virtual agent is associated with a subnet identifier. The system inserts this subnet identifier into the generated RPST as an identity claim while generating the RPST.

In an embodiment, a container instance control plane receives, during the session, a CRUD request corresponding to a container instance and determines the subnet associated with virtual agent from the (RPST) (Operation 704). The request includes the RPST that contains the subnet identifier.

In an example, the request is from a virtual agent to create or modify a container instance for a pod. The container instance is in the service tenancy, but the container instance is associated with the subnet (and VNIC). When the administrator created the virtual agent, the administrator authorized the virtual node to use that subnet using a command such as:

CreateVirtualAgent (customer, subnet/object2 in Customer tenancy}

In an embodiment, a container instance control plane determines the container instance subnet (Operation 706). For example, the container instance control plane extracts the subnet from the RPST with the request, especially before the container instance is created. When a container instance has already been created, the subnet is determined from the request and/or based on metadata associated with the container instance such as a tag at the container instance. In an example, the container instance control plane obtains the identity principal, corresponding to the virtual agent, concurrently with receiving the request or prior to receiving the request.

In an embodiment, a container instance control plane checks if the virtual agent subnet matches the container instance subnet (Operation 708). For example, the container instance control plane uses an admit policy to check if the subnet matches the container instance subnet.

In an embodiment, the subnet assigned to the virtual agent is determined based on the Resource Principal Session Token (RPST) for a session during which the request is received from the virtual agent. The container instance control plane determines if the subnet assigned to the virtual agent matches the subnet associated with the container instance by executing a policy that references the RPST or using the identity principal corresponding to the virtual agent.

In an embodiment, the container instance control plane uses the admit policy to authorize a request to create a container instance and associate the container instance with the subnet or VNIC. The container instance control plane uses the admit policy to ensure that a VNIC is created in the subnet as indicated by the identity principal.

In accordance with an embodiment, the service tenancy creates an admit policy. An example admit policy admits any element to associate container instances in the service tenancy with subnets in a customer tenancy when request.principal.type is equal to the virtual agent type, and request.principal.subnet is equal to the target container subnet. In the admit policy, the system allows the virtual node resource principal to create or modify a container instance associated with the network in a subnet identified in the virtual node resource principal. An exemplary admit policy concerns an API call of the form Subject—Virtual Node Resource Principal-Customer Tenancy Object1—Container Instance-Service Tenancy Object2—Subnet-Customer Tenancy Object3—Network Security Group-Customer Tenancy And an exemplary API call for the request is Subject→caller Object→target resource accessed (CRUD)

Operation→read/write/associate

An exemplary admit policy is

{virtual agent resource principal for customer VN} {associates} {Container Instance/object1 in service tenancy} with {Subnet/object2 in customer tenancy}, where {virtual agent resource principal.subnet_custom_claim={subnet/object2 in customer tenancy}}.

In an embodiment, if the virtual agent subnet does not match the container instance subnet, the container instance control plane rejects the request (Operation 710). The container instance control plane sends a rejection response to the virtual agent. The virtual agent then reports the failure to the container orchestration API server. Thus, the container instance control plane blocks virtual agents from one subnet from creating or modifying a container instance of another subnet.

In an embodiment, a container instance control plane checks if there is an endorsement from a customer of cloud network provider (Operation 712). The system uses an endorse policy to check the request. An exemplary endorse policy is of the same form as the admit policy. The customer tenancy creates the endorse policy. The endorse policy, like the admit policy, policy allows any element to associate container instances in the service tenancy with subnets in a customer tenancy when request.principal.type is equal to the virtual agent type, and request.principal.subnet is equal to the target container subnet. Using the endorse policy, the customer tenancy endorses the admit policy and allows the virtual node resource principal to create or modify a container instance associated with only with the network in a subnet identified in the virtual node resource principal.

In an embodiment, if there is not an endorsement from a customer of a cloud network provider, the container instance control plane rejects the request (Operation 710). Operation 710 is described above.

In an embodiment, if there is an endorsement from a customer of a cloud network provider, the container instance control plane executes the operation corresponding to the request (Operation 716). Exemplary operations include CRUD operations such as Get/Delete/RetrieveLogs/ExecuteContainer operations. The virtual agent uses requests to create container instances, to load the container instances with pods and containers, to delete container instances and to obtain logs or other information from the container instances. In response to a create request, the container instance control plane creates a container instance and an associated VNIC restricted to the subnet. Pods and containers on the container instance use the VNIC to network with the customer tenancy.

6. EXAMPLE EMBODIMENT

Figure 8:
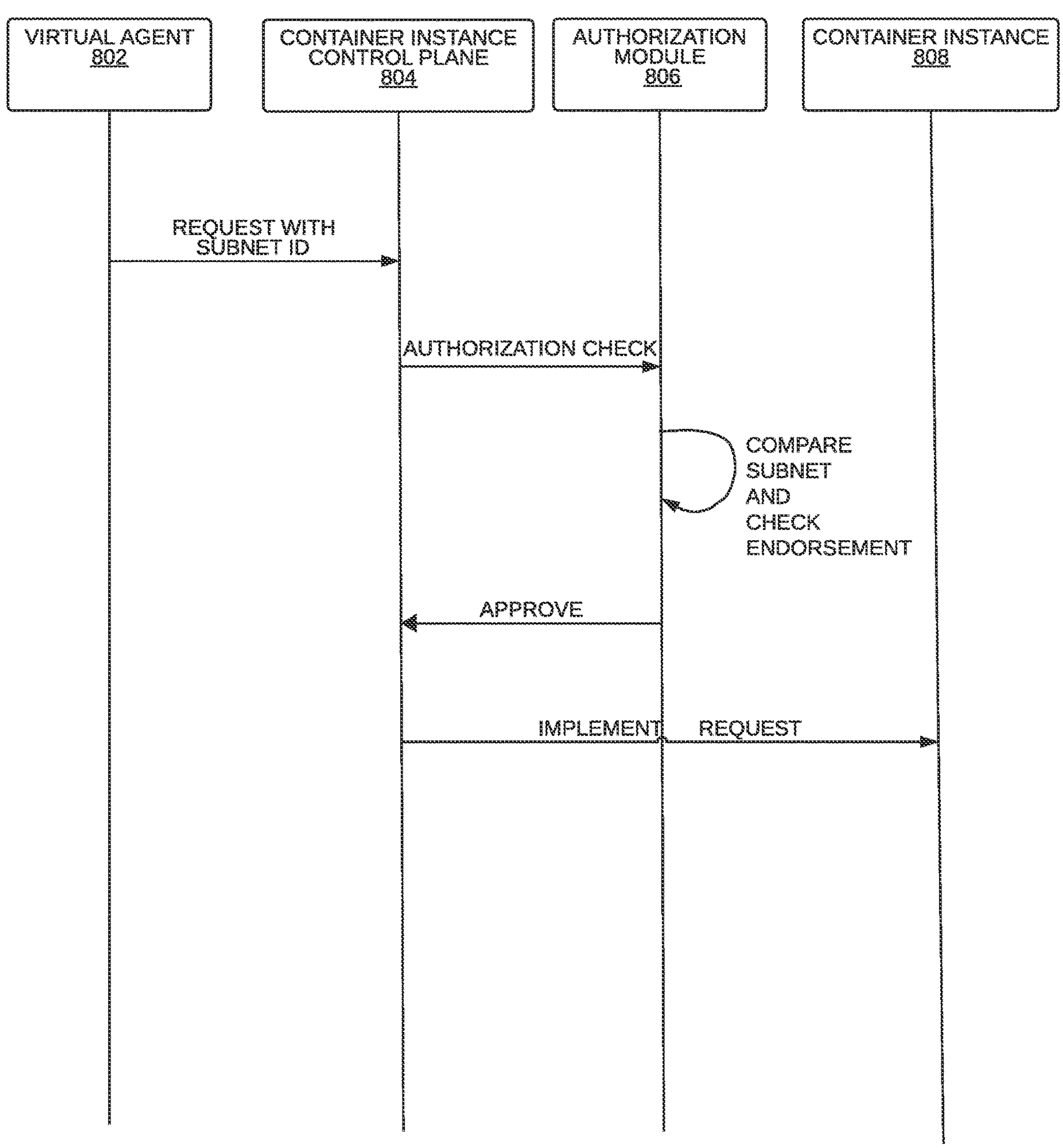
FIG. 8 illustrates an example signal diagram using a subnet to evaluate requests from a virtual agent in accordance with one or more embodiments.

FIG. 8 illustrates an example signal diagram using a subnet to evaluate requests from a virtual agent in accordance with one or more embodiments. One or more operations illustrated in FIG. 8 may be modified, rearranged, or omitted. Accordingly, the particular sequence of operations illustrated in FIG. 8 should not be construed as limiting the scope of one or more embodiments.

In an embodiment, virtual agent 802 sends a request to container instance control plane 804, including a subnet identifier. In an example, the request includes an RPST with the subnet identifier. The virtual agent uses requests to the container instance control plane to perform various tasks, such as creating container instances, loading container instances with pods and containers, deleting container instances, and retrieving logs from container instances.

In an embodiment, container instance control plane 804 does an authorization check with authorization module 806. Authorization module 806 checks the subnet and checks for an endorsement. For example, authorization module 806 uses an admit policy and an endorse policy to determine if the virtual agent 802 is authorized to perform an operation concerning container instance 808.

In an embodiment, authorization module 806 approves the authorization check to container instance control plane 804. Container instance control plane 804 then implements the operation corresponding to the request at the container instance 808. Example operations include creating container instance 808, loading container instance 808 with pods and containers, deleting container instance 808, and retrieving logs from container instance 808.

7. PRACTICAL APPLICATIONS, ADVANTAGES & IMPROVEMENTS

Matching subnets before permitting requests in a cloud environment has the practical advantage of ensuring security and isolation in a multi-tenant cloud computing environment. By checking the subnet, the system ensures that requests are not made on one customer's network by another customer of the multi-tenant cloud computing environment. By enabling multi-tenant cloud computing, the described techniques allow for the advantages of multitenancy. Multitenancy allows multiple customers to share the same underlying infrastructure. As a result, cloud providers achieve better resource utilization and cost savings. Multi-tenant architectures are inherently scalable. When new tenants join, they seamlessly share the existing infrastructure without significant adjustments. In a multitenant environment, resources (such as servers and storage) are efficiently utilized. Tenants quickly provision services without waiting for dedicated hardware or software setup. Cloud providers handle maintenance, security patches, and updates centrally. Tenants benefit from these improvements without individual efforts, reducing the administrative burden on tenants. Multitenancy enables elasticity since, as demand fluctuates, resources are dynamically allocated or released. Further, fewer physical servers are needed, leading to reduced energy consumption and carbon footprint.

7. MISCELLANEOUS; EXTENSIONS

Unless otherwise defined, terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:

receiving, from a virtual agent in a cloud network at a container instance control plane, a request corresponding to a container instance associated with a first subnet, wherein the virtual agent comprises a process executed external to the container instance;

determining that the virtual agent is assigned to a second subnet, wherein the second subnet is based on an identity principal corresponding to the virtual agent;

determining if the second subnet assigned to the virtual agent matches the first subnet associated with the container instance;

responsive at least to determining that the second subnet assigned to the virtual agent matches the first subnet associated with the container instance, permitting the request corresponding to the container instance; and based at least on the request being permitted, executing at least one operation corresponding to the request.

2. The non-transitory media of claim 1, wherein the operations further comprise determining the second subnet, assigned to the virtual agent, based on a Resource Principal Session Token (RPST) for a session during which the request is received from the virtual agent.

3. The non-transitory media of claim 2, wherein the operations further comprise:

generating the RPST with an identification of the second subnet being comprised within the RPST.

4. The non-transitory media of claim 3, wherein determining if the second subnet assigned to the virtual agent matches the first subnet associated with the container instance comprises executing a policy that references the RPST.

5. The non-transitory media of claim 1, wherein the operations further comprise receiving the identity principal, corresponding to the virtual agent, concurrently with receiving the request or prior to receiving the request.

6. The non-transitory media of claim 1, wherein the request is permitted based further on determining that the request is received from an entity of a virtual agent type.

7. The non-transitory media of claim 1, wherein the request comprises a Create, Read, Update, or Delete (CRUD) request corresponding to the container instance.

8. The non-transitory media of claim 1, wherein the virtual agent is comprised in a virtual node and wherein the container instance is in a service tenancy and executes containers corresponding to the virtual node.

9. The non-transitory media of claim 1, wherein a management plane assigns the second subnet to the virtual agent.

10. The non-transitory media of claim 1, wherein executing the at least one operation corresponding to the request is based further on endorsement of the request, permitted by a cloud network provider of the cloud network, by a customer of the cloud network provider.

11. The non-transitory media of claim 1, wherein the operations further comprise:

receiving, from a second virtual agent in the cloud network at the container instance control plane, a second request corresponding to a second container instance associated with a third subnet;

determining if a fourth subnet assigned to the second virtual agent matches the third subnet associated with the second container instance; and responsive at least to determining that the fourth subnet assigned to the second virtual agent does not match the third subnet associated with the container instance, denying the request corresponding to the container instance.

12. The non-transitory media of claim 1, wherein determining if the second subnet assigned to the virtual agent matches the first subnet comprises extracting subnet information from authentication credentials associated with the virtual agent.

13. A system comprising:

at least one device including a hardware processor; and the system being configured to perform operations comprising:

receiving, from a virtual agent in a cloud network at a container instance control plane, a request corresponding to a container instance associated with a first subnet, wherein the virtual agent comprises a process executed external to the container instance;

determining that the virtual agent is assigned to a second subnet, wherein the second subnet is based on an identity principal corresponding to the virtual agent;

determining if the second subnet assigned to the virtual agent matches the first subnet associated with the container instance;

responsive at least to determining that the second subnet assigned to the virtual agent matches the first subnet associated with the container instance, permitting the request corresponding to the container instance; and based at least on the request being permitted, executing at least one operation corresponding to the request.

14. The system of claim 13, wherein the operations further comprise determining the second subnet, assigned to the virtual agent, based on a Resource Principal Session Token (RPST) for a session during which the request is received from the virtual agent.

15. A method comprising:

receiving, from a virtual agent in a cloud network at a container instance control plane, a request corresponding to a container instance associated with a first subnet, wherein the virtual agent comprises a process executed external to the container instance;

determining that the virtual agent is assigned to a second subnet, wherein the second subnet is based on an identity principal corresponding to the virtual agent;

determining if the second subnet assigned to the virtual agent matches the first subnet associated with the container instance;

responsive at least to determining that the second subnet assigned to the virtual agent matches the first subnet associated with the container instance, permitting the request corresponding to the container instance; and based at least on the request being permitted, executing at least one operation corresponding to the request;

wherein the method is performed by at least one device including a hardware processor.

16. The method of claim 15, wherein the operations further comprise determining the second subnet, assigned to the virtual agent, based on a Resource Principal Session Token (RPST) for a session during which the request is received from the virtual agent.

17. The method of claim 16, wherein the operations further comprise:

generating the RPST with an identification of the second subnet being comprised within the RPST.

18. The method of claim 17, wherein determining if the second subnet assigned to the virtual agent matches the first subnet associated with the container instance comprises executing a policy that references the RPST.

19. The method of claim 15, wherein the operations further comprise receiving the identity principal, corresponding to the virtual agent, concurrently with receiving the request or prior to receiving the request.

20. The method of claim 15, wherein determining if the second subnet assigned to the virtual agent matches the first subnet comprises extracting subnet information from authentication credentials associated with the virtual agent.

* * * * *